Oct. 12, 1943.   C. D. HERDER   2,331,685
TURBINE INLET PIPING
Filed Sept. 19, 1942

Inventor
C. D. Herder
by K. R. Wyman
Attorney

Patented Oct. 12, 1943

2,331,685

UNITED STATES PATENT OFFICE 2,331,685

TURBINE INLET PIPING

Carl D. Herder, Milwaukee, Wis., assignor to Allis-Chalmers Manufacturing Company, Milwaukee, Wis., a corporation of Delaware Application September 19, 1942, Serial No. 459,023

12 Claims. (Cl. 138—64)

This invention relates generally to elastic fluid turbine apparatus and more particularly to high temperature gaseous motive confining and conducting structures capable of safely withstanding large variations in the temperature and pressure of the confined fluid.

The invention is particularly applicable, although in no manner limited, to vertically inclined portions of the jacketed combustion chambers and/or fluid conductors employed in combustion turbine systems in which the inner motive fluid confining wall and the means supporting and spacing same from the outer wall become extremely hot and incapable of withstanding the stresses set up therein (a) by appreciable differences in the pressures of the fluids acting upon opposite sides of said wall, (b) by its expansion and contraction, both longitudinally and radially, relative to the outer wall, and (c) by the weight of the thick layer of insulation which is disposed between the inner and outer walls and supported in part by the means interconnecting and spacing said walls.

In recently proposed constructions, the stresses set up by said pressure differences and relative expansion are entirely eliminated and/or materially reduced by providing breathing openings in the inner wall and filling the space between the inner and outer walls with permeable insulation and by supporting the inner wall on the outer wall in a manner permitting movements of the inner wall, both longitudinally and radially with respect to the outer wall. These proposed constructions are satisfactory for horizontal combustion chamber and conduit portions and also for elbow portions in which approximately half of the weight of the insulation is distributed over the confining portion of the inner and outer walls, but they are not entirely satisfactory for vertically inclined portions in which much of the weight of the insulation is necessarily carried by the means interconnecting and spacing said walls since the number of interconnecting and spacing means must be increased in order to provide supports having sufficient strength which materially increases the heat transmitted to the outer wall.

It is therefore an object of this invention to provide an improved inner wall or lining suspension for a vertical portion of a high temperature gaseous fluid confining structure which minimizes heat conduction to the outer surrounding wall, which affords the necessary breathing action and effects a reduction in the forces resisting both longitudinal and radial expansion of the lining, and which minimizes the stresses imparted to the lining and other highly heated portions connected therewith by the insulation disposed between the lining and outer wall.

In accordance with this invention, one or more of the aforementioned improved results may be obtained by employing lining sections each of which is spaced from and connected with said outer wall for both longitudinal and radial movement relative thereto by means of an insulation supporting structure effective to transmit to the outer wall substantially the entire weight of the lining section and the weight of the insulation disposed between the lining section and said outer wall without imparting any material degree of stress to the lining section or to the highly heated portions of the supporting structure connected therewith.

The invention accordingly consists of the various features of construction, combinations of elements and arrangements of parts as more fully set forth in the appended claims and in the detailed description, reference being had to the accompanying drawing, in which:

Figure 2:
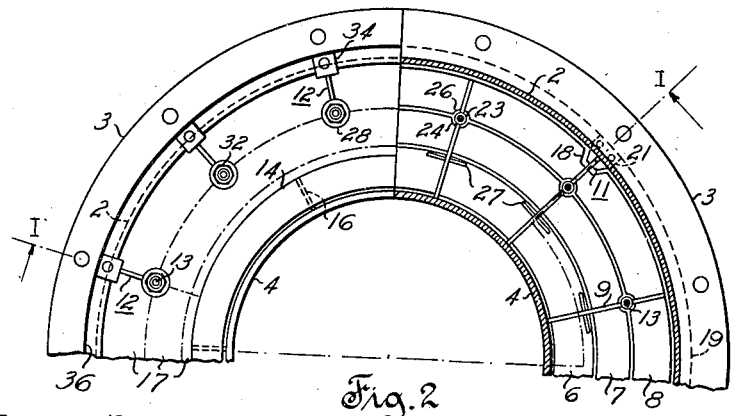
Fig. 2 is a partial transverse section taken on line II—II of Fig. 1.
Figure 1:
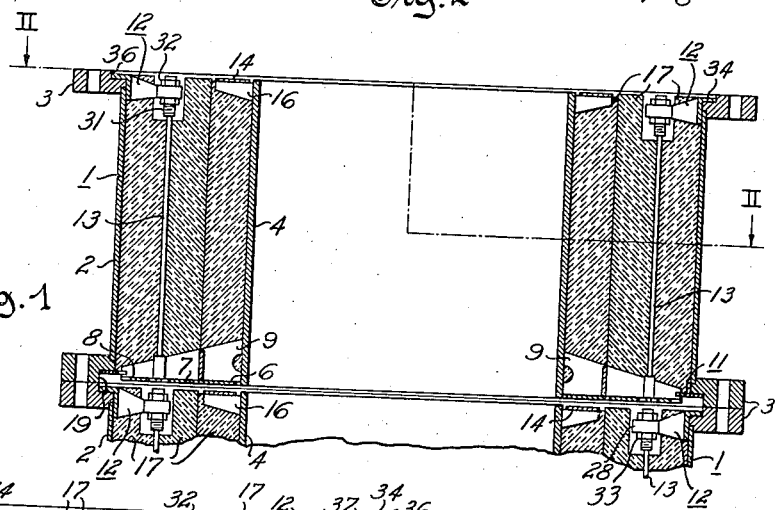
Fig. 1 is a longitudinal section taken on line I—I of Fig. 2 illustrating a vertically extending combustion turbine inlet conduit embodying the invention.

Referring to Figs. 1 and 2 of the drawing, it is seen that vertical piping embodying the invention may be formed in separable portions 1 each comprising an annular outer wall section 2 having flanged ends 3 adapted to be bolted or otherwise coaxially secured to similar sections to form a pipe of desired length, an inner annular lining section 4, a plurality of annular disks 6, 7 and 8, a plurality of connectors 9 mounting said disks on the outer lower end surface portion of the inner section 4 in radially spaced concentric relation with respect to said inner section and with respect to each other, a plurality of connections 11 guidingly interconnecting outer peripheral portions of the disk 8 in radially spaced coaxial relation with opposed portions of the outer wall section 2 for movement both radially and longitudinally relative thereto, a plurality of cantilever beam members 12 secured to and extending radially inward from the upper end portion of the outer wall section 2, a plurality of laterally flexible elements 13 adjustably connecting intermediate portions of the connectors 9 and the underlying disks 7 and 8 with the end portions of the beam members 12, an annular cover member 14, which is in the nature of a disk, secured in spaced concentric relation to the outer upper end surface portion of each inner section 4 by means of brackets 16 and permeable insulation 17 substantially filling the space between said inner and outer sections.

Figure 3:
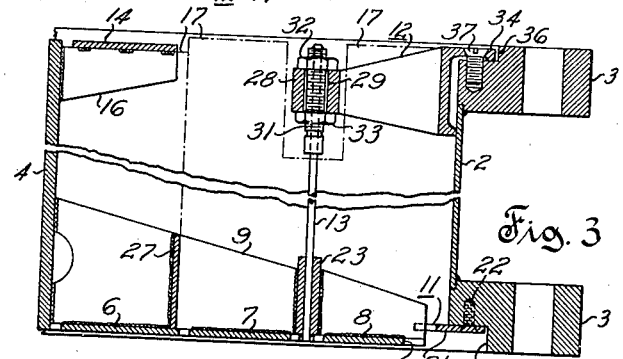
Fig. 3 is an enlarged view of the right-hand side of the structure shown in Fig. 2 with the insulation indicated in dot-dash lines in the interest of simplicity.
Figure 5:
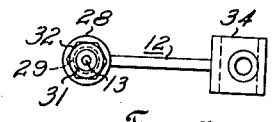
Fig. 5 is a plan view of the lining suspension bracket shown in Fig. 3.
Figure 4:
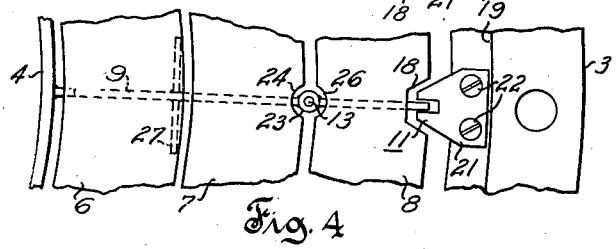
Fig. 4 is a bottom view of the structure shown in Fig. 3.

The outer peripheral portion of the disk 8 is provided with a series of circumferentially spaced, outwardly diverging radial slots 18 and the outer end portions of the connectors 9 extend in overlying relation with respect to said slots with their outer ends terminating substantially flush with the outer periphery of the disk 8. The guiding interconnection 11 is formed by the outer ends of some of the connectors 9 and by a series of circumferentially spaced bifurcated tabs 21 removably secured in an annular recess 19, which is formed in the opposed flanged portion 3 of the outer section 2, by any suitable means such as the screws 22 with their bifurcated ends extending radially inward and receiving therebetween the adjacent end of the opposed connector 9. The portion of the connector 9 intermediate the disks 7 and 8 has formed or fabricated integrally therewith a vertically extending tubular member 23 adapted to receive therein the lower end of the laterally flexible element 13. As shown in Figs. 3 and 4, the connector 9 is made in two pieces with the member 23 welded therebetween. The adjacent opposed edge portions of disks 7 and 8 are provided with semi-circular notches 24 and 26, respectively, in order to space said disks from the member 23. The lower end of the laterally flexible element 13 is welded to the bottom of the tubular member 23. The connectors 9 may be stiffened to prevent lateral flexing thereof by welding thereto the transverse members 27. Heat transfer from the inner section 4 to the connectors 9 secured thereto is reduced to a minimum by cutting away portions of the connectors to decrease the contact area between the inner ends of said connectors and the inner section.

The inner end of each cantilever beam member 12 terminates in an enlarged inner end portion 28 having a bore or opening 29 extending vertically therethrough. The upper end of each of the laterally flexible elements 13 has secured thereon an externally threaded member 31 of less diameter than the bore 29; the member 31 extending loosely through said bore and being adjustably connected with the coacting beam member 12 by means of nuts 32 and 33 adapted to engage the upper and lower surfaces of the enlarged portion 28, respectively. As shown, each element 13 is welded to the upper end of the member 31 disposed thereon and it should now be obvious that by suitably turning the nuts 32 and 33 on the members 31, the effective vertical length of each element 13 can be varied as desired within limits determined by the length of the member 31 secured thereon. The beam members 12 may be formed integral with the upper flanged end of the outer section 2 or removably fixed thereon by having their outer upper end portions terminating in projections 34 disposed within an annular recess 36 formed in the upper flanged end 3 of the outer section 2 and secured therein by means of screws 37.

The sections 1 can be readily assembled in different ways, one of which comprises (a) welding the brackets 16 to the annular cover disk 14; (b) welding the disks 6, 7 and 8 to the connectors 9 which have embodied therein the tubular members 23; (c) uniting the brackets 16 and the connectors 9 to the inner section 4, thereby producing a unit comprising the inner section 4, the disks 6, 7 and 8, the connectors 9, the brackets 16 and the cover member 14 correlated in the manner shown in Fig. 3; (d) inserting the lower end of the laterally flexible elements 13 (it being assumed that externally threaded members 31 have already been welded to the upper ends of the elements 13) in the tubular members 23 and welding the exposed lower end of each element 13 to the bottom portion of the member 23; (e) stacking preformed blocks of permeable insulation about the lining section 4, the insulation being supported by the disks 6, 7 and 8 united thereto with one or more blocks omitted to provide space for placing the cantilever beam members 12 over the members 31 on the elements 13; (f) coaxially sliding thereabout the annular outer section 2 to which may have already been secured the cantilever beam members 12, the bores 29 in the ends of the cantilever beam members being alined with and receiving therein the members 31 on which have already been placed the lower nuts 33; (g) placing the upper nuts 32 on the members 31 and adjusting the positions of the nuts 32 and 33 to effect the desired vertical adjustment of the unit, comprising the inner section 4, the disks 6, 7 and 8, the connectors 9, the brackets 16, the cover members 14 and the insulation supported on the disks 6, 7 and 8, relative to the outer section 2; (h) attaching the guiding tabs 21 to the lower flanged end 3 of the outer section 2 as shown; and (i) filling the space left for the insertion of the cantilever beam members 12 with insulation. If the length of the pipe necessitates constructing same in two or more sections, an additional section or sections are assembled as just described and the sections are then placed in coaxial abutting relation and secured together in the manner indicated in Fig. 1 to form a pipe of desired length. The use of preformed blocks of insulation obviously complicates, to some extent, the assembly of the sections 1. However, the use of loose insulation should be avoided in combustion gas turbine installations as it may be drawn into the gas stream and seriously damage the turbine receiving same.

The lining sections 4 and the disks and cover members secured thereto are axially spaced apart from the like elements of adjacent sections in order to permit relative longitudinal expansion and contraction thereof and in order to provide a space therebetween which is in communication with the interior of the inner sections 4 and with the space filled with the permeable insulation 17 to thereby provide the breathing action necessary to maintain the pressures acting upon opposite sides of the lining section 4 substantially equal at all times. The lining sections 4 and the parts united therewith, such as the cover members 14 and the disks 6, 7 and 8 and the insulation disposed between the inner and outer sections, are carried or supported entirely by a relatively cool portion of the outer wall by means of the cantilever beam members 12 and the laterally flexible elements 13 interconnecting the ends of the beam members with an intermediate portion of the connectors 9 which in effect is the same as connecting the ends of said beam members with an intermediate portion of the horizontal insulation supporting wall formed by the disks secured to the connectors 9. In other words, the cantilever beam members 12 and the elements 13 provide means suspendingly interconnecting intermediate portions of the insulation support, which in addition to the insulation also carries the lining section 4, with portions of said outer wall spaced a considerable distance above the insulation supporting wall.

The guiding tabs 21 will permit both longitudinal and radial movement of the unit, comprising the insulation support and lining, relative to the outer wall. However, the elements 13, although permitting radial movements of said unit relative to said outer wall due to their lateral flexibility, obviously function to maintain the insulation support, i. e., the disks 6, 7 and 8, the connectors 9 and the adjacent end of the lining section 4, in a predetermined relation with respect to the opposed bottom portion of the outer section 2. In other words, the insulation support and the elements 13 fix the lower end of the lining section 4 relative to the lower end of the outer section 2 and prevent, except for negligible longitudinal movements of the insulation support produced by slight variations in the length of elements 13 effected by lateral deflections thereof and by their expansion and contraction relative to the outer wall section, a longitudinal movement of the lower end of the inner section 4 relative to the lower end of the outer section 2. Obviously, with the construction just specified, the inner sections are substantially free to expand longitudinally, i. e., vertically upward, relative to the fixed lower ends thereof and they are also substantially free to expand radially relative to the outer wall section 2.

The only metallic connection between the inner section 4 and the outer section 2 is that provided by the restricted cross sectional area of the elements 13 and by the sliding contact between outer ends of the connectors 9 and the bifurcated ends of the tabs 21. Consequently, it should also be obvious that the above described construction reduces heat transfer between the inner and outer wall sections to a minimum and provides a support which suspends the entire weight of the lining section, the horizontal insulation supporting wall connected threwith, and the insulation disposed thereon from the outer wall section which is relatively cool and therefore capable of supporting said weight without danger of excessively stressing said wall.

The invention is of general application with respect to high temperature fluid confining structures embodying vertical wall sections, and although the invention is illustrated as applied to inlet piping of the type embodied in combustion gas turbine systems, it should be understood that it is not desired to limit the invention to the exact details of construction herein shown and described as various modifications within the scope of the appended claims may occur to persons skilled in the art.

It is claimed and desired to secure by Letters Patent:

1. A confining structure for a high temperature gaseous fluid comprising a vertically inclined outer wall, a vertically inclined inner wall having secured to its lower end a laterally extending insulation support and spacing wall portion guidingly connected with opposite portions of the outer wall for movement both longitudinally and radially relative thereto, and means suspendingly interconnecting intermediate portions of said spacing wall portion with portions of said outer wall spaced a considerable distance above said spacing wall portion.

2. A confining structure for a high temperature gaseous fluid comprising a vertically inclined outer wall, a vertically inclined inner wall having secured to its lower end a laterally extending insulation support and spacing wall portion guidingly connected with opposite portions of the outer wall for movement both longitudinally and radially relative thereto, and a plurality of laterally flexible means suspendingly interconnecting intermediate portions of said spacing wall portion with portions of said outer wall opposite the upper end of said inner wall.

3. A confining structure for a high temperature gaseous fluid comprising a vertically inclined outer wall, a vertically inclined inner wall having secured to its lower end a laterally extending insulation support and spacing wall portion guidingly connected with opposite portions of the outer wall for movement both longitudinally and radially relative thereto, means suspendingly interconnecting intermediate portions of said spacing wall portion with portions of said outer wall spaced a considerable distance above said spacing wall portion, and insulation carried by said support and spacing wall portion and substantially filling the space between said inner and outer walls.

4. A confining structure for a high temperature gaseous fluid comprising a vertically inclined outer wall, a vertically inclined inner wall spaced from said outer wall, a transverse insulation support disposed between said walls and being united with the lower end portion of said inner wall, means guidingly interconnecting said support with said outer wall for movement both longitudinally and radially relative thereto, and means suspendingly interconnecting intermediate portions of said support with portions of said outer wall spaced a considerable distance above said support.

5. A confining structure for a high temperature gaseous fluid comprising a vertical outer wall, a vertical inner wall spaced from said outer wall, said inner wall having its lower end interconnected with opposite portions of said outer wall for movement both longitudinally and radially relative thereto by means united with said inner wall and forming in effect a horizontal wall adapted to support insulation disposed between said inner and outer walls, and means suspendingly interconnecting intermediate portions of said horizontal wall with portions of said outer wall spaced a considerable distance above said horizontal wall.

6. A confining structure for a high temperature gaseous fluid comprising a vertical outer wall, a vertical inner wall, means including a plurality of wall forming members united to the outer surface of the lower end of said inner wall in laterally spaced horizontal wall forming relation, means guidingly interconnecting said united members with opposed portions of said outer wall for movement both longitudinally and radially relative thereto, and means including laterally flexible elements suspendingly interconnecting intermediate portions of said united members with portions of said outer wall spaced a considerable distance above said united members.

7. A confining structure for a high temperature gaseous fluid comprising a vertically extending annular outer wall, a vertically extending annular inner wall, means including concentric disks united to the lower end of said inner wall in radially spaced horizontal wall forming relation, means guidingly interconnecting outer peripheral portions of said united disks with opposed portions of said outer wall for movement both longitudinally and radially relative to the outer wall, and means including a series of circumferentially spaced cantilever beam members and laterally flexible elements suspendingly interconnecting intermediate portions of said united disks with portions of said outer wall spaced a considerable distance above said disks.

8. A confining structure for a high temperature gaseous fluid comprising a vertically extending annular outer wall, a vertically extending annular inner wall, concentric disks united in radially spaced relation with respect to each other, means securing said united disks in radially spaced, concentric, horizontal wall forming relation on the lower end of said inner wall, means guidingly interconnecting outer peripheral portions of said united disks in radially spaced relation with opposed portions of said outer wall for movement both longitudinally and radially relative thereto, a series of circumferentially spaced cantilever beam members extending inward from portions of said outer wall a considerable distance above said guiding interconnections, and laterally flexible elements connecting intermediate portions of said united disks with said beam members to thereby suspend said inner wall and disks as a unit from said series of beam members.

9. A confining structure for a high temperature gaseous fluid comprising a vertically extending annular outer wall, a vertically extending annular inner wall, concentric disks united in radially spaced relation with respect to each other, means securing said united disks in radially spaced, concentric, horizontal wall forming relation on the lower end of said inner wall, means guidingly interconnecting outer peripheral portions of said united disks in radially spaced relation with opposed portions of said outer wall for movement both longitudinally and radially relative thereto, a series of circumferentially spaced cantilever beam members extending inward from portions of said outer wall a considerable distance above said guiding interconnections, laterally flexible elements connecting intermediate portions of said united disks with the end portions of said beam members to thereby suspend said inner wall and united disks as a unit from said series of beam members, insulation supported by said united disks and substantially filling the annular space between said inner and outer walls, and an annular horizontal cover member disposed between upper opposed portions of said inner and outer walls.

10. A confining structure for a high temperature gaseous fluid comprising a vertically extending annular outer wall, annular inner wall forming sections disposed in proximate end to end relation, a group of concentric disks united in radially spaced relation with respect to each other and secured in concentric horizontal wall forming relation to the lower end of each section, means guidingly interconnecting outer peripheral portions of said group of disks with opposed portions of said outer wall for movement both longitudinally and radially relative thereto, means connecting intermediate portions of said group of disks with portions of said outer wall spaced a considerable distance above said guiding interconnections to thereby suspend each section and the group of disks secured thereto as a unit from opposed portions of said outer wall, and permeable insulation substantially filling each annular compartment formed by an annular section, the group of disks secured thereto and the opposed inner surface of said outer wall.

11. A confining structure for a high temperature gaseous fluid comprising a vertically extending annular outer wall, annular inner wall forming sections disposed in proximate end to end relation, a group of concentric disks united in radially spaced relation with respect to each other and secured in concentric horizontal wall forming relation to the lower end of each section, means guidingly interconnecting outer peripheral portions of said group of disks with opposed portions of said outer wall for movement both longitudinally and radially relative thereto, means connecting intermediate portions of said group of disks with portions of said outer wall spaced a considerable distance above said guiding interconnections to thereby suspend each section and the group of disks secured thereto as a unit from opposed portions of said outer wall, permeable insulation substantially filling each annular compartment formed by an annuular section, the group of disks secured thereto and the opposed inner surfaces of said outer wall, and an annular cover member secured to the upper end of each section in coaxial radially spaced relation with respect to said section and with respect to the surrounding outer wall.

12. A confining structure for a high temperature gaseous fluid comprising a vertically extending annular outer wall, annular inner wall forming sections disposed in proximate end to end relation, a group of concentric disks united in radially spaced relation with respect to each other and secured in concentric horizontal wall forming relation to the lower end of each section, means guidingly interconnecting outer peripheral portions of said group of disks with opposed portions of said outer wall for movement both longitudinally and radially relative thereto, a series of circumferentially spaced cantilever beam members extending inward from portions of said outer wall adjacent the upper end of each section, laterally flexible elements connecting intermediate portions of said group of disks with end portions of the adjacent overlying series of beam members to thereby suspend each section and the group of disks secured thereto as a unit from said series of beam members, permeable insulation substantially filling each annular compartment formed by an annular section, the group of disks secured thereto and the opposed inner surface of said outer wall, and an annular cover member secured to the upper end of each section in coaxial radially spaced relation with respect to said section and with respect to the inner ends of the adjacent series of beam members.

CARL D. HERDER.